US010075060B2

(12) United States Patent
Koivula et al.

(10) Patent No.: US 10,075,060 B2
(45) Date of Patent: Sep. 11, 2018

(54) ELECTRICAL ASSEMBLY COMPRISING FILTER DEVICE FOR IMPROVING QUALITY OF ELECTRICITY

(71) Applicant: ABB Schweiz AG, Baden (CH)

(72) Inventors: Ville Koivula, Helsinki (FI); Markku Järvelä, Tampere (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/465,398

(22) Filed: Mar. 21, 2017

(65) Prior Publication Data

US 2017/0271974 A1   Sep. 21, 2017

(30) Foreign Application Priority Data

Mar. 21, 2016  (EP) ..................... 16161351

(51) Int. Cl.
| | |
|---|---|
| G05F 5/00 | (2006.01) |
| H02H 7/122 | (2006.01) |
| H02M 7/521 | (2006.01) |
| H02M 1/12 | (2006.01) |
| H02M 7/539 | (2006.01) |

(52) U.S. Cl.
CPC ........... *H02M 1/126* (2013.01); *H02M 7/539* (2013.01)

(58) Field of Classification Search
CPC ........... H02M 1/126; H02M 2001/123; H02M 7/4826; H02M 7/5387; H02H 7/122
USPC ...... 323/207, 209–211, 906; 363/39, 40, 55, 363/56.01, 56.02, 131, 132, 135–138
See application file for complete search history.

(56) References Cited

U.S. PATENT DOCUMENTS 6,774,608 B2 *  8/2004  Hofstetter ................. H02J 3/01
322/22
8,897,040 B2 *  11/2014  Holliday .................. H02H 9/04
363/37

(Continued)

FOREIGN PATENT DOCUMENTS

| CN | 104300777 A | 1/2015 |
|---|---|---|
| EP | 2566022 A1 | 3/2013 |
| EP | 2651025 A1 | 10/2013 |

OTHER PUBLICATIONS

European Search Report, EP16161351, dated Sep. 5, 2016, 4 pages.

*Primary Examiner* — Gary Nash
(74) *Attorney, Agent, or Firm* — J. Bruce Schelkopf; Taft Stettinius & Hollister LLP

(57) ABSTRACT

An electrical assembly comprising power conversion system (PCM) having an output (OT1), a filter device (2) connected to the output (OT1) of the power conversion system (PCM), a pre-charging circuit (PCC), and an interface (ITF) for connecting the electrical assembly to an electrical power network (GRD). The filter device (2) comprises inductor system and filter capacitor system adapted to co-operate with the inductor system for filtering an alternating current. The filter device (2) comprises a capacitor switch device (S3) for disconnecting the filter capacitor system from the inductor system. The electrical assembly comprises a grid switch device (S4) connected in parallel with the pre-charging circuit (PCC). The parallel connected pre-charging circuit (PCC) and grid switch device (S4) are operationally connected between the output (OT1) of the power conversion system (PCM) and the interface (ITF) of the electrical assembly.

8 Claims, 3 Drawing Sheets

(56) References Cited

U.S. PATENT DOCUMENTS

| | | | |
|---|---|---|---|
| 2009/0237964 A1* | 9/2009 | Serpa | H02M 1/12 363/40 |
| 2012/0081938 A1* | 4/2012 | Kuenzel | H02M 1/126 363/123 |
| 2014/0159498 A1* | 6/2014 | Torres | H02M 1/12 307/91 |

* cited by examiner

ELECTRICAL ASSEMBLY COMPRISING FILTER DEVICE FOR IMPROVING QUALITY OF ELECTRICITY

FIELD OF THE INVENTION

The present invention relates to an electrical assembly comprising a filter device for improving quality of electricity.

It is known in the art to use an LC circuit, also called a resonant circuit, for filtering an alternating current. An LC circuit is an electric circuit comprising at least one inductor and at least one capacitor electrically connected together. An example of a known filter device is described in publication US 2014/159498. An example of a known electrical assembly comprising a filter device is described in publication CN 104 300 777.

A known filter device 201' comprising an LC circuit is shown in FIG. 1. The filter device 201' is an LCL filter adapted to improve quality of electricity by filtering harmonics present in an alternating current. The filter device 201' comprises a first terminal T1', a second terminal T2', inductor means connected in series between the first terminal T1' and the second terminal T2', and filter capacitor means adapted to co-operate with the inductor means for filtering an alternating current present between the first terminal T1' and the second terminal T2'.

FIG. 2 shows a known solar power station comprising photovoltaic cell means PV', power conversion means PCM', the filter device 201' of FIG. 1 and a network switch device S101'. The power conversion means PCM' comprises three inverter units INV1', INV2' and INV3' adapted to converter direct current generated by the photovoltaic cell means PV' into three-phase alternating current, and to supply the three-phase alternating current to an electrical power network GRD' through an output OT1' of the power conversion means PCM'. The filter device 201' is connected between the output OT1' of the power conversion means PCM' and the electrical power network GRD'. The network switch device S101' is connected between the filter device 201' and the electrical power network GRD'. The network switch device S101' enables disconnecting the solar power station from the electrical power network GRD'.

One of the disadvantages associated with the solar power station of FIG. 2 is that the filter device 201' generates reactive power irrespective of whether the photovoltaic cell means PV' generates electricity or not. When the power conversion means PCM' is not operating, the only way to reduce the reactive power generation of the filter device 201' is to disconnect the entire solar power station from the electrical power network GRD' by opening the network switch device S101'. Therefore the network switch device S101' is an essential component for reducing reactive power generation of the filter device 201' during idle hours of the solar power station. Switch devices suitable to be used as the network switch device S101' have limited availability especially in the case of utility scale photovoltaic inverters, in addition to which they are expensive and large components.

BRIEF DESCRIPTION OF THE INVENTION

An object of the present invention is to provide an electrical assembly comprising a filter device so as to alleviate the above disadvantages. The objects of the invention are achieved by an electrical assembly which is characterized by what is stated in the independent claim 1. The preferred embodiments of the invention are disclosed in the dependent claims.

The invention is based on the idea of providing an electrical assembly comprising at least one inverter unit and a pre-charging circuit with a filter device comprising a capacitor switch device for disconnecting filter capacitor means from inductor means.

An advantage of the electrical assembly of the invention is that by keeping the capacitor switch device of the filter device in an open position during a pre-charge step reduces current through the pre-charging circuit since there is no current flowing through the filter capacitor means of the filter device. Reduced current during the pre-charge step enables selecting components with lower current rating for the pre-charging circuit. Consequently keeping the capacitor switch device in an open position during the pre-charge step enables lowering manufacturing costs of the pre-charging circuit.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
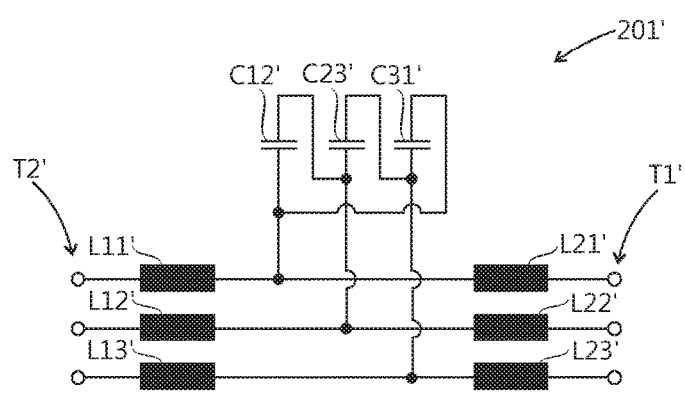
FIG. 1 shows a known filter device.
Figure 3:
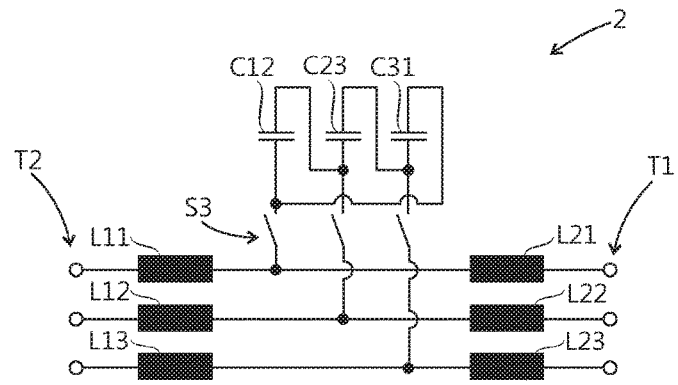
FIG. 3 shows a filter device comprising a capacitor switch device.

FIG. 3 shows a filter device 2 for improving quality of electricity, the filter device 2 comprising a first terminal T1, a second terminal T2, inductor means connected in series between the first terminal T1 and the second terminal T2, filter capacitor means adapted to co-operate with the inductor means for filtering an alternating current present between the first terminal T1 and the second terminal T2, and a capacitor switch device S3 for disconnecting the filter capacitor means from the inductor means. The first terminal T1 is adapted for connecting the filter device 2 to a first portion of an alternating-current network, and the second terminal T2 is adapted for connecting the filter device 2 to a second portion of the alternating-current network. Except for the capacitor switch device S3, the filter device 2 is identical with the known filter device 201' shown in FIG. 1. Herein expression "switch device" encompasses all types of switches including electrically controlled switches. For example, a switch device can be a contactor.

The capacitor switch device S3 has a closed position and an open position. Herein, a closed position of a switch device means a conductive state of the switch device, and an open position of a switch device means a non-conductive state of the switch device. In the closed position of the capacitor switch device S3, the filter device 2 is adapted to improve quality of electricity by filtering harmonics from an alternating current present between the first terminal T1 and the second terminal T2. The closed position of the capacitor switch device S3 allows capacitive current flow via the filter capacitor means. In the open position of the capacitor switch device S3 reactive power generation of the filter device 2 is drastically lower than in the closed position of the capacitor switch device S3 since the open position of the capacitor switch device S3 prevents capacitive current from flowing via the filter capacitor means. In the open position of the capacitor switch device S3, the filter device 2 acts as an L-filter thus generating only inductive reactive power and filtering current harmonics. Electricity can be transferred between the first terminal T1 and the second terminal T2 irrespective of the position of the capacitor switch device S3.

The filter device 2 is a three-phase LCL filter device. Both the first terminal T1 and the second terminal T2 comprises a three-phase terminal. The inductor means comprises for each phase a first inductor and a second inductor connected in series between the first terminal T1 and the second terminal T2. A first phase comprises a first inductor L11 and a second inductor L21, a second phase comprises a first inductor L12 and a second inductor L22, and a third phase comprises a first inductor L13 and a second inductor L23.

The filter device 2 has a nominal current greater than 1000 A. Alternatively a filter device can have a nominal current greater than 100 A. Nominal current required for a capacitor switch device is substantially less than a nominal current of the entire filter device.

The filter capacitor means is operationally connected to each phase between the first inductor and the second inductor. The filter capacitor means comprises delta connected capacitors C12, C23 and C31. Capacitor C12 is connected between the first and the second phase, capacitor C23 is connected between the second and the third phase, and capacitor C31 is connected between the third and the first phase. Alternatively three-phase filter capacitor means can comprise three capacitors connected in star, the star point can be either grounded or floating regards to the ground potential.

Figure 4:
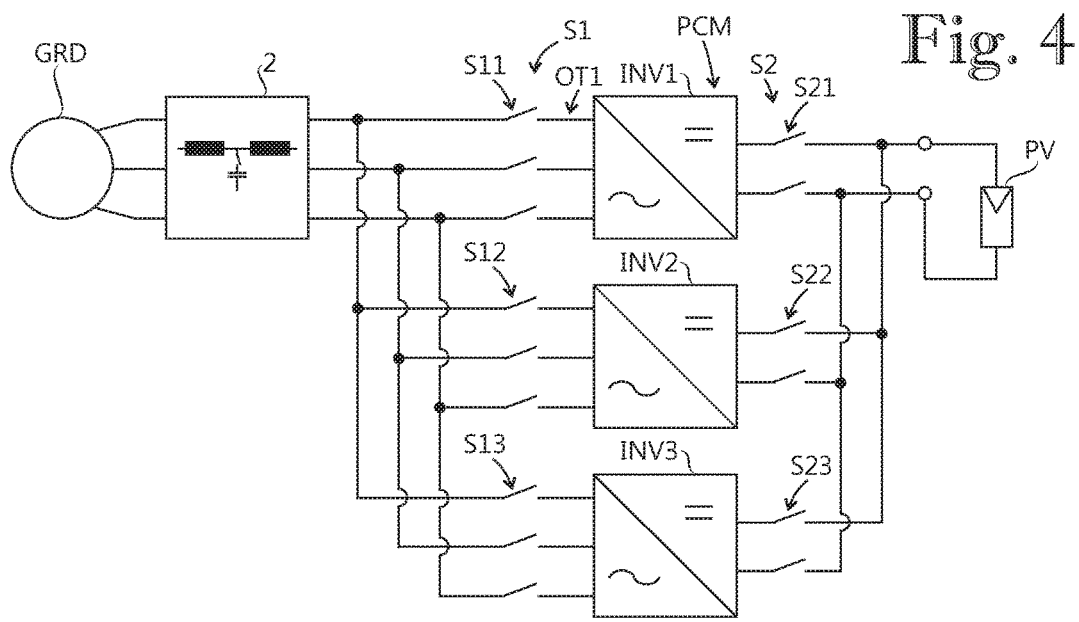
FIG. 4 shows a solar power station comprising the filter device of FIG. 3.

FIG. 4 shows a solar power station comprising photovoltaic cell means PV, power conversion means PCM, and the filter device 2 of FIG. 3. The photovoltaic cell means PV comprises a photovoltaic cell adapted to convert solar energy into direct current. The power conversion means PCM is adapted to convert electric energy from one form to another. The power conversion means PCM comprises three inverter units INV1, INV2 and INV3 adapted to convert direct current generated by the photovoltaic cell means PV into three-phase alternating current, and to supply the three-phase alternating current to an electrical power network GRD through an output OT1 of the power conversion means PCM. The inverter units INV1, INV2 and INV3 are connected in parallel. The filter device 2 is connected between the output OT1 of the power conversion means PCM and the electrical power network GRD.

In FIG. 4 circuit diagrams of the inverter units INV1, INV2 and INV3 are not illustrated. A circuit diagram of each of the inverter units INV1, INV2 and INV3 can be identical with the circuit diagram of the inverter unit INV1 shown in FIG. 5.

Power conversion means can comprise only one inverter unit. Alternatively power conversion means can comprise a plurality of inverter units.

Figure 2:
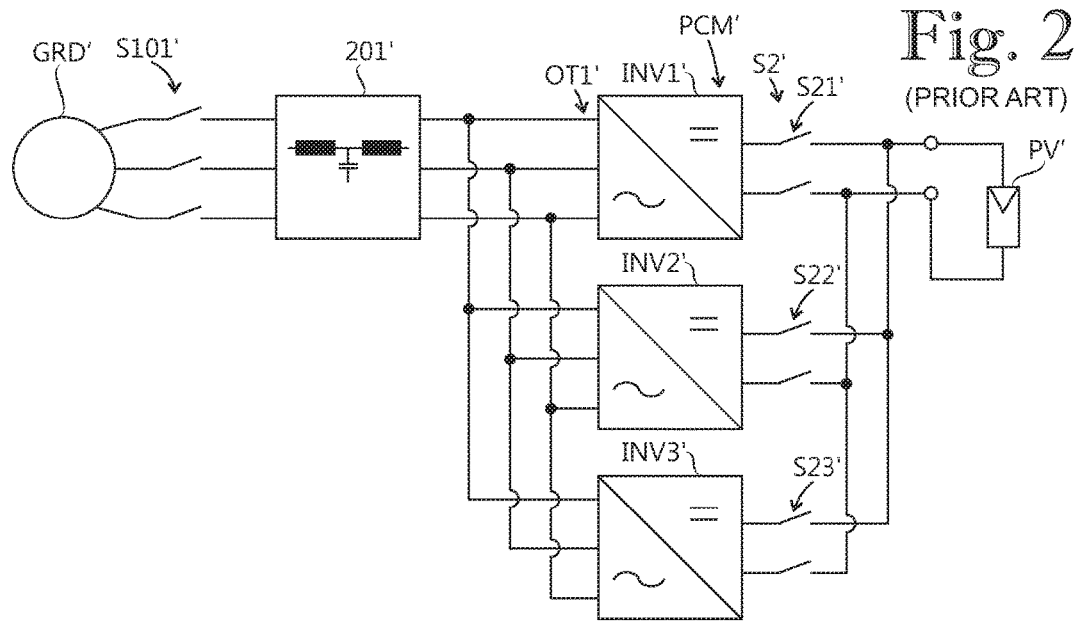
FIG. 2 shows a known solar power station comprising the filter device of FIG. 1.

The solar power station of FIG. 4 differs from the known solar power station of FIG. 2 in two ways. Firstly, the known filter device 201' is replaced with the filter device 2 comprising a capacitor switch device. Secondly, the network switch device S101' connected between the filter device 201' and the electrical power network GRD' is replaced with the output switch means S1 connected between the power conversion means PCM and the filter device 2. Except for above mentioned differences, the structures of the solar power stations shown in FIGS. 2 and 4 are identical.

The power conversion means PCM is connected to the photovoltaic cell means PV through input switch means S2, and to the filter device 2 through output switch means S1. The input switch means S2 is adapted for disconnecting the power conversion means PCM from the photovoltaic cell means PV. The input switch means S2 comprises a direct current switch for each inverter unit. The input switch means S2 comprises a switch S21 connected to the direct current input of the inverter unit INV1, a switch S22 connected to the direct current input of the inverter unit INV2, and a switch S23 connected to the direct current input of the inverter unit INV3.

The output switch means S1 is adapted for disconnecting the power conversion means PCM from the filter device 2, and consequently from the electrical power network GRD. The output switch means S1 comprises a three-phase switch for each inverter unit. The output switch means S1 comprises a switch S11 connected to the output of the inverter unit INV1, a switch S12 connected to the output of the inverter unit INV2, and a switch S13 connected to the output of the inverter unit INV3.

The input switch means S2 and the output switch means S1 improve controllability and fault tolerance of the power conversion means PCM. Owing to the input switch means S2 and the output switch means S1, inverter units INV1, INV2 and INV3 can be individually connected to and disconnected from the rest of the solar power station. A further advantage of the output switch means S1 of FIG. 4 compared with the network switch device S101' of FIG. 2 is lower costs since three switch devices with lower ratings are more inexpensive than one big switch device with a high rating, wherein the network switch device S101' is capable of transferring a current equivalent to the sum of currents that the switches S11, S12 and S13 are capable of transferring.

If individual connectivity of inverter units is not needed, output switch means can be omitted entirely, which provides significant cost savings. In the assembly with no output switch means an intermittent circuit of each inverter unit is constantly energized due to the electrical power network. If necessary, any inverter unit can be disconnected from the photovoltaic cell means by a corresponding direct current switch of the input switch means.

A method of operating the solar power station of FIG. 4 comprises a step of keeping the capacitor switch device S3 closed while the photovoltaic cell means PV generates power into the electrical power network GRD. The method further comprises a step of opening the capacitor switch device S3 in predetermined idle situations in which insolation is too low to enable the photovoltaic cell means PV to generate power into the electrical power network GRD. The capacitor switch device S3 is kept open until insolation is high enough for the photovoltaic cell means PV to generate power into the electrical power network GRD. When the switches S11, S12 and S13 are in their open position and also the capacitor switch device S3 is in open position, substantially zero reactive or active current flows through the filter device 2. This approach enables to utilize the solar power station of FIG. 4 as if there was a network switch device between the electrical power network GRD and the filter device 2.

In a method of operating the solar power station of FIG. 4, the capacitor switch device S3 is a contactor and the power conversion means PCM comprises a controller adapted to control the capacitor switch device S3. In predetermined idle situations in which insolation is too low to enable the photovoltaic cell means PV to generate power into the electrical power network GRD, the controller of the power conversion means PCM opens the capacitor switch device S3. When insolation is high enough to enable the photovoltaic cell means PV to generate power into the electrical power network GRD, the controller of the power conversion means PCM closes the capacitor switch device S3.

Power conversion means can comprise a controller adapted to control a capacitor switch device of a filter device into a closed position when the power conversion means becomes active, and to control the capacitor switch device into an open position when the power conversion means becomes inactive. In other words the capacitor switch device is kept in a closed position when electric power is transferred between the power conversion means and the electrical power network, and the capacitor switch device is kept in an open position when no electric power is transferred between the power conversion means and the electrical power network. In case the power conversion means comprises an inverter unit, the capacitor switch device is closed when the inverter unit starts to modulate, and the capacitor switch device is opened when the inverter unit stops modulating. Said modulation operation can be used for different purposes, for example for compensating reactive power in the electrical power network.

Figure 5:
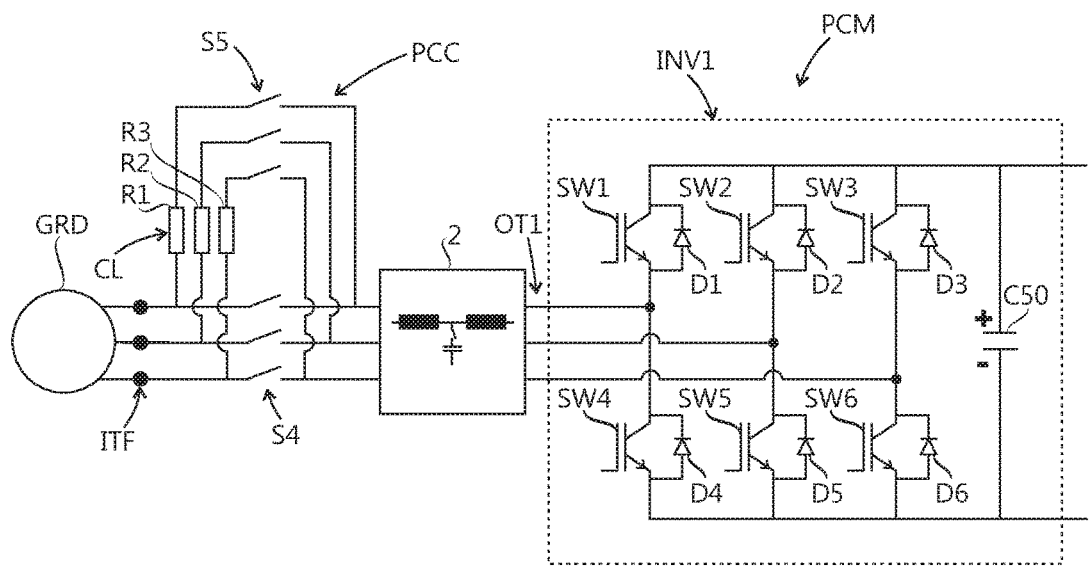
FIG. 5 shows an electrical assembly according to an embodiment of the invention.

FIG. 5 shows an electrical assembly comprising power conversion means PCM, the filter device 2 of FIG. 3, a grid switch device S4, a pre-charging circuit PCC and an interface ITF. The electrical assembly is connected to electrical power network GRD through the interface ITF which comprises a three-phase terminal. The grid switch device S4 is connected operationally between the interface ITF and the filter device 2. The filter device 2 is connected between an output OT1 of the power conversion means PCM and the grid switch device S4. The power conversion means PCM is adapted to control the capacitor switch device S3 and the grid switch device S4.

The power conversion means PCM comprises an inverter unit INV1. The inverter unit INV1 comprises six controllable switches SW1-SW6 and an intermediate circuit capacitor means C50 connected between a direct current input of the inverter unit INV1 and the controllable switches SW1-SW6. A capacitance of the intermediate circuit capacitor means C50 is substantially higher than a capacitance of the filter capacitor means of the filter device 2.

The controllable switches SW1-SW6 are adapted to invert direct current supplied into the inverter unit INV1 through the direct current input of the inverter unit INV1, and to supply the resultant alternating current out of the inverter unit INV1 through the output OT1 of the power conversion means PCM. Each of the plurality of controllable switches SW1-SW6 has a flyback diode connected antiparallel with the controllable switch. The flyback diodes are denoted with reference signs D1-D6.

The pre-charging circuit PCC is adapted to pre-charge the intermediate circuit capacitor means C50 before commissioning of the electrical assembly. The pre-charging circuit PCC is connected operationally between the interface ITF and the filter device 2. The pre-charging circuit PCC comprises a current limiting device CL and a pre-charging switch device S5 adapted to connect the interface ITF to the intermediate circuit capacitor means C50 through the current limiting device CL. The power conversion means PCM is adapted to control the pre-charging switch device S5. The pre-charging circuit PCC is connected in parallel with the grid switch device S4.

In an embodiment the power conversion means comprises a controller adapted to control the capacitor switch device, the grid switch device and the pre-charging switch device. The controller can comprise any known suitable controller.

In the electrical assembly of FIG. 5 the current limiting device CL comprises a current limiting resistor per each phase. The current limiting resistors are denoted with reference signs R1, R2 and R3. Alternatively a current limiting device can comprise at least one current limiting choke.

A method of operating the electrical assembly of FIG. 5 comprises a pre-charge step and a normal use step. In the pre-charge step the pre-charging switch device S5 is in a closed position, and the capacitor switch device S3 and the grid switch device S4 are in an open position such that a limited pre-charge current is flowing from the electrical power network GRD to the intermediate circuit capacitor means C50 through the current limiting device CL and the flyback diodes D1-D6. This means that during the pre-charge step a current between the electrical power network GRD and the filter device 2 flows exclusively through the pre-charging circuit PCC bypassing the grid switch device S4.

Keeping the capacitor switch device S3 in an open position during the pre-charge step reduces current through the pre-charging circuit PCC since there is no current flowing through the filter capacitor means of the filter device 2. Reduced current during the pre-charge step enables selecting components with lower current rating for the pre-charging circuit PCC. Consequently keeping the capacitor switch device S3 in an open position during the pre-charge step lowers manufacturing costs of the pre-charging circuit PCC.

In the normal use step the pre-charging switch device S5 is in an open position, and the capacitor switch device S3 and the grid switch device S4 are in a closed position such that an operating current is flowing from the power conversion means PCM to the electrical power network GRD through the grid switch device S4.

The pre-charge step is adapted to be used in a situation in which the intermediate circuit capacitor means C50 requires charging. The normal use step is adapted to be used during normal operation of the electrical assembly.

In the embodiment of FIG. 5 the parallel connected pre-charging circuit PCC and grid switch device S4 are connected between the interface ITF and the filter device 2. In an alternative embodiment parallel connected pre-charging circuit and grid switch device are connected between a filter device and power conversion means. For example, the solar power station of FIG. 4 could be modified by connecting a pre-charging circuit PCC shown in FIG. 5 parallel to switch S11.

Figure 6:
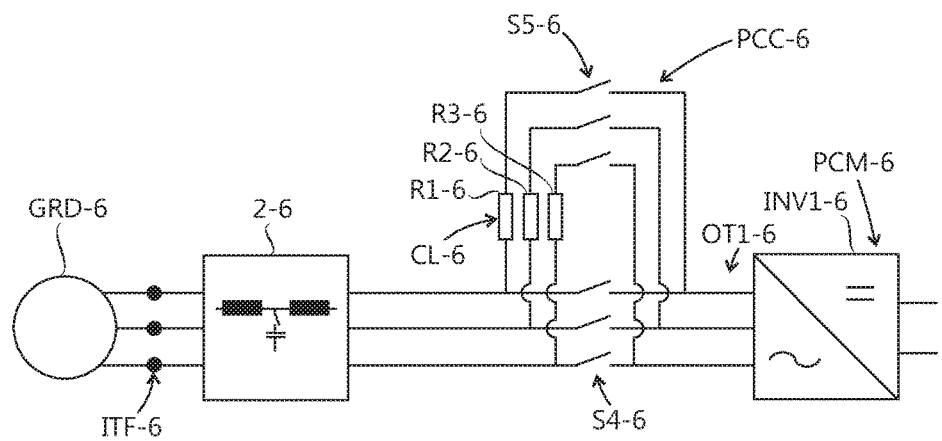
FIG. 6 shows an electrical assembly according to another embodiment of the invention.

FIG. 6 shows an electrical assembly which is a modification of the electrical assembly shown in FIG. 5. The electrical assembly of FIG. 6 comprises the same components as the electrical assembly of FIG. 5. In order to distinguish the embodiments of FIG. 5 and FIG. 6, components in FIG. 6 are denoted with reference signs ending with "-6". The only difference between the electrical assemblies of FIG. 5 and FIG. 6 relates to location of the parallel connected pre-charging circuit and grid switch device. In FIG. 5 the filter device 2 is connected directly to the output OT1 of the power conversion means PCM. In FIG. 6 the filter device 2-6 is connected to the output OT1-6 of the power conversion means PCM-6 through the parallel connected pre-charging circuit PCC-6 and grid switch device S4-6.

In both electrical assemblies shown in FIGS. 5 and 6, the parallel connected pre-charging circuit and grid switch device are operationally connected between the output of the power conversion means and the interface of the electrical assembly. Therefore alternating current can be transferred between the interface of the electrical assembly and the power conversion means selectively through the pre-charging circuit or bypassing the pre-charging circuit. In both electrical assemblies shown in FIGS. 5 and 6, the filter device is operationally connected between the output of the power conversion means and the interface of the electrical assembly.

In FIGS. 5 and 6, power conversion means comprises an inverter unit. In an alternative embodiment the inverter INV1 of FIG. 5 is replaced with a plurality of parallel connected inverters. In another alternative embodiment the inverter INV1-6 of FIG. 6 is replaced with a plurality of parallel connected inverters. In both said alternative embodiments the pre-charging circuit of the electrical assembly is adapted to pre-charge the intermediate circuit capacitor means of the plurality of the parallel connected inverters before commissioning of the electrical assembly.

It will be obvious to a person skilled in the art that the inventive concept can be implemented in various ways. The invention and its embodiments are not limited to the examples described above but may vary within the scope of the claims.

The invention claimed is:

1. An electrical assembly comprising:
power conversion system adapted to convert electric energy from one form to another, the power conversion system having an output adapted to supply three-phase alternating current to an electrical power network, the power conversion system comprises at least one inverter unit which comprises intermediate circuit capacitor system connected to a direct current input of the at least one inverter unit;
a filter device connected to the output of the power conversion system, the filter device comprising a first terminal for connecting the filter device to a first portion of an alternating-current network, a second terminal for connecting the filter device to a second portion of the alternating-current network, the filter device being adapted to carry alternating current between the first terminal and the second terminal, inductor system connected in series between the first terminal and the second terminal, and filter capacitor system adapted to co-operate with the inductor system for filtering an alternating current present between the first terminal and the second terminal;
a pre-charging circuit adapted to pre-charge the intermediate circuit capacitor system before commissioning of the electrical assembly, the pre-charging circuit comprises a current limiting device and a pre-charging switch device adapted to connect the electrical power network to the intermediate circuit capacitor system through the current limiting device,
an interface for connecting the electrical assembly to the electrical power network,
wherein the filter device comprises a capacitor switch device for disconnecting the filter capacitor system from the inductor system, the electrical assembly comprises a grid switch device connected in parallel with the pre-charging circuit, the parallel connected pre-charging circuit and grid switch device are operationally connected between the output of the power conversion system and the interface of the electrical assembly,
wherein the electrical assembly is arranged to be selectively controlled into a pre-charge state and a normal use state, wherein in the pre-charge state the pre-charging switch device is in a closed position, and the capacitor switch device and the grid switch device are in an open position in order to allow a limited pre-charge current to flow from the electrical power network to the intermediate circuit capacitor system through the current limiting device, and wherein in the normal use state the pre-charging switch device is in an open position, and the capacitor switch device and the grid switch device are in a closed position in order to allow a current to flow between the at least one inverter unit and the electrical power network such that the current bypasses the current limiting device.

2. The electrical assembly according to claim 1, wherein the inductor system comprises for each phase a first inductor and a second inductor connected in series between the first terminal and the second terminal.

3. The electrical assembly according to claim 2, wherein the filter capacitor system is connected to each phase between the first inductor and the second inductor.

4. The electrical assembly according to claim 1, wherein a capacitance of the intermediate circuit capacitor system is substantially higher than a capacitance of the filter capacitor system.

5. The electrical assembly according to claim 1, wherein the at least one inverter unit comprises a plurality of controllable switches adapted to invert direct current supplied into the at least one inverter unit through the direct current input of the at least one inverter unit, and to supply the resultant alternating current out of the at least one inverter unit through the output of the power conversion system, each of the plurality of controllable switches having a flyback diode connected antiparallel with the controllable switch.

6. The electrical assembly according to claim 1, wherein the current limiting device comprises a current limiting resistor and/or a current limiting choke.

7. A method of operating an electrical assembly,
wherein the electrical assembly comprises:
power conversion system adapted to convert electric energy from one form to another, the power conversion system having an output adapted to supply three-phase alternating current to an electrical power network, the power conversion system comprises at least one inverter unit which comprises intermediate circuit capacitor system connected to a direct current input of the at least one inverter unit;
a filter device connected to the output of the power conversion system, the filter device comprising a first terminal for connecting the filter device to a first portion of an alternating-current network, a second terminal for connecting the filter device to a second portion of the alternating-current network, the filter device being adapted to carry alternating current between the first terminal and the second terminal, inductor system connected in series between the first terminal and the second terminal, and filter capacitor system adapted to co-operate with the inductor system for filtering an alternating current present between the first terminal and the second terminal;

a pre-charging circuit adapted to pre-charge the intermediate circuit capacitor system before commissioning of the electrical assembly, the pre-charging circuit comprises a current limiting device and a pre-charging switch device adapted to connect the electrical power network to the intermediate circuit capacitor system through the current limiting device, an interface for connecting the electrical assembly to the electrical power network, wherein the filter device comprises a capacitor switch device for disconnecting the filter capacitor system from the inductor system, the electrical assembly comprises a grid switch device connected in parallel with the pre-charging circuit, the parallel connected pre-charging circuit and grid switch device are operationally connected between the output of the power conversion system and the interface of the electrical assembly;

wherein the method comprises:

a pre-charge step in which the pre-charging switch device is in a closed position, and the capacitor switch device and the grid switch device are in an open position such that a limited pre-charge current is flowing from an electrical power network to the intermediate circuit capacitor system through the current limiting device; and a normal use step in which the pre-charging switch device is in an open position, and the capacitor switch device and the grid switch device are in a closed position such that a current flowing between the at least one inverter unit and the electrical power network bypasses the current limiting device.

8. An electrical assembly comprising:

power conversion system adapted to convert electric energy from one form to another, the power conversion system having an output adapted to supply three-phase alternating current to an electrical power network, the power conversion system comprises at least one inverter unit which comprises intermediate circuit capacitor system connected to a direct current input of the at least one inverter unit;

a filter device connected to the output of the power conversion system, the filter device comprising a first terminal for connecting the filter device to a first portion of an alternating-current network, a second terminal for connecting the filter device to a second portion of the alternating-current network, the filter device being adapted to carry alternating current between the first terminal and the second terminal, inductor system connected in series between the first terminal and the second terminal, and filter capacitor system adapted to co-operate with the inductor system for filtering an alternating current present between the first terminal and the second terminal;

a pre-charging circuit adapted to pre-charge the intermediate circuit capacitor system before commissioning of the electrical assembly, the pre-charging circuit comprises a current limiting device and a pre-charging switch device adapted to connect the electrical power network to the intermediate circuit capacitor system through the current limiting device, an interface for connecting the electrical assembly to the electrical power network, wherein the filter device comprises a capacitor switch device for disconnecting the filter capacitor system from the inductor system, the electrical assembly comprises a grid switch device connected in parallel with the pre-charging circuit, the parallel connected pre-charging circuit and grid switch device are operationally connected between the output of the power conversion system and the interface of the electrical assembly, wherein the electrical assembly is arranged such that in an open position of the capacitor switch device, the filter device acts as an L-filter thus generating only inductive reactive power and filtering current harmonics, and electricity can be transferred between the first terminal and the second terminal irrespective of the position of the capacitor switch device.

* * * * *